United States Patent
Eshel et al.

(10) Patent No.: US 9,727,578 B2
(45) Date of Patent: Aug. 8, 2017

(54) COORDINATED ACCESS TO A FILE SYSTEM'S SHARED STORAGE USING DYNAMIC CREATION OF FILE ACCESS LAYOUT

(71) Applicant: INTERNATIONAL BUSINESS MACHINES CORPORATION, Armonk, NY (US)

(72) Inventors: Marc Eshel, San Jose, CA (US); Dean Hildebrand, Sumas, WA (US); Frank B. Schmuck, Campbell, CA (US); James C. Wyllie, Monte Sereno, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 505 days.

(21) Appl. No.: 13/630,684

(22) Filed: Sep. 28, 2012

(65) Prior Publication Data
US 2014/0095582 A1    Apr. 3, 2014

(51) Int. Cl.
*H04L 29/06* (2006.01)
*G06F 17/30* (2006.01)
(Continued)

(52) U.S. Cl.
CPC ........ *G06F 17/30203* (2013.01); *G06F 3/067* (2013.01); *G06F 3/0613* (2013.01);
(Continued)

(58) Field of Classification Search
CPC ............... G06F 17/30224; G06F 17/30; G06F 17/30132; G06F 17/30203; G06F 17/301;
(Continued)

(56) References Cited

U.S. PATENT DOCUMENTS 5,987,506 A    11/1999    Carter et al.
7,730,057 B2   6/2010     Bell et al.
(Continued)

OTHER PUBLICATIONS

"IBM Scale Out Network Attached Storage Concepts", IBM.com/redbook, Nov. 2010.*
(Continued)

*Primary Examiner* — Aaron Strange
(74) *Attorney, Agent, or Firm* — Erik Huestis; Stephen Kenny; Foley Hoag LLP (57) ABSTRACT

Embodiments of the invention relate to supporting coordinated access to a clustered file system's shared disk storage subsystem by using dynamic creation of file access layout for different workloads and access patterns. Active file servers in the cluster have equivalent access to shared data of said file system. In one embodiment, a particular file server in the cluster is configured to coordinate the file system's layout. The particular file server, in response to a particular client's request for a layout of a file stored by said file system in said subsystem determines a file access layout for a parallel file access protocol to use when servicing an I/O request by said client, marks said layout as active for the client, and sends the layout to the client. The file access layout is determined based on one or more of current file system resources, a specific workload type and a specific byte-range of the file included in the client request, and properties of the file. The layout includes a set of file servers in said cluster and byte ranges of the file, and the byte-range being associated with a particular server among the set.

26 Claims, 8 Drawing Sheets

(51) Int. Cl.
  *H04L 29/08* (2006.01)
  *G06F 3/06* (2006.01)
(52) U.S. Cl.
  CPC ...... *G06F 3/0635* (2013.01); *G06F 17/30194*
    (2013.01); *G06F 17/30283* (2013.01); *H04L*
    *67/1097* (2013.01)
(58) Field of Classification Search
  CPC ............. G06F 17/30171; G06F 17/302; G06F
    17/30283; G06F 3/067; G06F 17/30194;
    H04L 67/1002; H04L 67/1034; H04L
    67/1097; H04L 67/1008; H04L 67/1012;
    H04L 67/1031; H04L 67/2842; H04L
    67/10
  USPC ........................................................ 709/226
  See application file for complete search history.

(56) References Cited

U.S. PATENT DOCUMENTS

| | | | |
|---|---|---|---|
| 7,966,343 | B2 | 6/2011 | Yang et al. |
| 8,086,585 | B1* | 12/2011 | Brashers et al. ............... 707/705 |
| 8,589,550 | B1* | 11/2013 | Faibish et al. ................. 709/226 |
| 2010/0293140 | A1 | 11/2010 | Nishiyama |
| 2011/0078467 | A1* | 3/2011 | Hildebrand ........... G06F 1/3203 713/310 |
| 2011/0191445 | A1* | 8/2011 | Dazzi ............................. 709/219 |
| 2011/0222442 | A1 | 9/2011 | Cole et al. |
| 2012/0011176 | A1* | 1/2012 | Aizman ......................... 707/822 |
| 2013/0110904 | A1* | 5/2013 | Okita ............................ 709/203 |

OTHER PUBLICATIONS

Amrutha Naik, Bikash Roy Choudhury, "Parallel Network File System Configuration and Best Practices for Data ONTAP 8.1 Cluster mode", NetApp May 2012.*
Goodson, Susarla, and Iyer "Standardizing Storage Clusters", 2007.*
IBM, Method for Easy Statistical View of Storage Disk Technology in Storage Servers and Virtulized Storage Farms, published in IP.com, Inc., IPCOM000188346D, Oct. 1, 2009, pp. 1-4.
R. Alimi et al., "A Survey of In-Network Storage Systems (RFC6392)", published in IP.com, Inc., IPCOM000213091D, Oct. 1, 2011, pp. 1-89.
Yin Wang et al., "Proportional-Share Scheduling for Distributed Storage Systems", 5th USENIX Conference on File and Storage Technologies (FAST'07), Feb. 2007, pp. 1-14.

* cited by examiner

COORDINATED ACCESS TO A FILE SYSTEM'S SHARED STORAGE USING DYNAMIC CREATION OF FILE ACCESS LAYOUT

CROSS-REFERENCE TO RELATED APPLICATIONS

This application is related to commonly assigned U.S. patent application Ser. No. 13/630,754, now U.S. Pat. No. 9,529,821, entitled "COORDINATED ACCESS TO A CLUSTERED FILE SYSTEM'S SHARED STORAGE USING SHARED-LOCK ARCHITECTURE," and U.S. patent application Ser. No. 13/630,861, now U.S. Pat. No. 8,799,335, entitled "SUPPORTING COORDINATED ACCESS TO A FILE SYSTEM'S SHARED STORAGE USING AUTOMATIC ALIGNMENT OF A PARALLEL FILE ACCESS PROTOCOL AND METADATA MANAGEMENT," both of which are filed concurrently with the present application and incorporated herein by reference in their entirety.

BACKGROUND

Embodiments of the invention relate to the field of data storage, and in particular, to supporting coordinated access to a clustered file system's shared disk storage subsystem by using dynamic creation of file access layout for different workloads and access patterns.

Data access in cloud computing architectures is beginning to center around scale out storage systems. For example, IBM SONAS™ (Scale Out Network Attached Storage™) is a storage scale out NAS offering designed to manage vast repositories of information in enterprise cloud computing environments requiring very large capacities (e.g., petabytes), high levels of performance, and high availability. IBM SONAS is built using the IBM General Parallel File System™ (GPFS™), a clustered file system high-performance enterprise file management platform that supports scalable and parallel cluster computing. The scale out storage systems thereby allows applications to access a single file system, storage device, single portion or data, or single file through multiple file servers in a cluster.

Third-party file access protocols are commonly used for remote access to file system data (e.g., FTP and HTTP). Most of these protocols are client-server based, with a single client accessing a single storage server. These protocols strangle the scalability of scale-out storage systems, and frequently cause data access bottlenecks, by limiting access to a single server. Coordinated and parallel file access protocols have been developed to simultaneously access multiple file servers in a remote cluster. These protocols help relieve storage bottlenecks, but their access must be coordinated by the storage system to maintain data access semantics (e.g., POSIX) and avoid corruption.

Parallel Network File System (pNFS) is a standardized parallel file access protocol extension of Network File System (NFS) protocol. pNFS is expected to be supported in most scale out storage systems in the future. pNFS, an integral part of NFSv4.1, transforms NFSv4 into a heterogeneous metadata protocol. pNFS clients and servers are responsible for control and file management operations, but delegate I/O functionality to a storage-specific layout driver on the client. pNFS clients can fully saturate the available bandwidth of the parallel file system by separating control and data flows. Each storage system may support pNFS or any similar parallel file access protocols in different ways. For example, to determine a specific file layout for I/O access, each storage system will have unique ways of creating an optimal layout to reduce latency and maximize I/O throughput.

BRIEF SUMMARY

An aspect of the invention includes a method of supporting coordinated access to a clustered file system's shared disk storage subsystem by using dynamic creation of file access layout for different workloads and access patterns, according to one embodiment. The file system includes a file server cluster with a shared disk storage subsystem that stores the file system's shared data and a plurality of file servers that are active and have equivalent access to the file system's shared data.

In one embodiment, a particular file server in the cluster is configured to coordinate the file system's layout. The particular file server, in response to a particular client's request for a layout of a file stored by said file system in said subsystem determines a file access layout for a parallel file access protocol to use when servicing an I/O request by said client, marks said layout as active for the client, and sends the layout to the client. The file access layout is determined based on one or more of current file system resources, a specific workload type and a specific byte-range of the file included in the client request, and properties of the file. The layout includes a set of file servers in said cluster and byte ranges of the file, and the byte-range being associated with a particular server among the set.

Details of the embodiments of the invention are described below in the Detailed Description section in reference to the accompanying drawings. This Brief Summary is intended to provide an overview of the claimed subject matter and is not intended to limit the scope of the claimed subject matter. Other features and advantages of this invention will become apparent from the following Detailed Description.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

The following Detailed Description of the embodiments of the system, method, and computer program product of the present invention, as presented in the Figures, is not intended to limit the scope of the invention, as claimed, but is merely representative of selected embodiments of the invention. The architecture of the present invention, as generally described and illustrated in the Figures herein, may be arranged and designed in a wide variety of different configurations. Thus, the following Detailed Description is intended only by way of example, and simply illustrates certain selected embodiments of systems and processes that are consistent with the invention as claimed herein.

Embodiments of the invention provide a method, file system, and computer program product of supporting coordinated access to the file system's (of the file server cluster) (hereinafter "clustered file system") shared disk storage subsystem (hereinafter "storage subsystem") by using dynamic creation of file access layout for different workloads and access patterns.

The claimed invention provides for flexible file access layout creation for different workloads and access patterns. Different workloads have a variety of access patterns that include a lot of small reads or writes to small files and simultaneously streaming I/O to large files. These two workloads are quite different and need to be handled in different ways. The symmetric server design of parallel file systems (e.g., GPFS™) means that layouts do not need to be fitted to the location of the actual data and file systems can create layouts to improve performance for a wide range of workloads. For example, a file system can create a different file access layout for each client and distribute the load across the file servers to improve multi-client read access to a small file. In another example, if a current file server is heavily loaded, it can be simply removed from created file access layouts during this period. In yet another example, file access layouts can change as file servers fail or are added, in which case these servers can be added or removed from new file access layouts but leave existing file access layouts unmodified, if possible.

Figure 1:
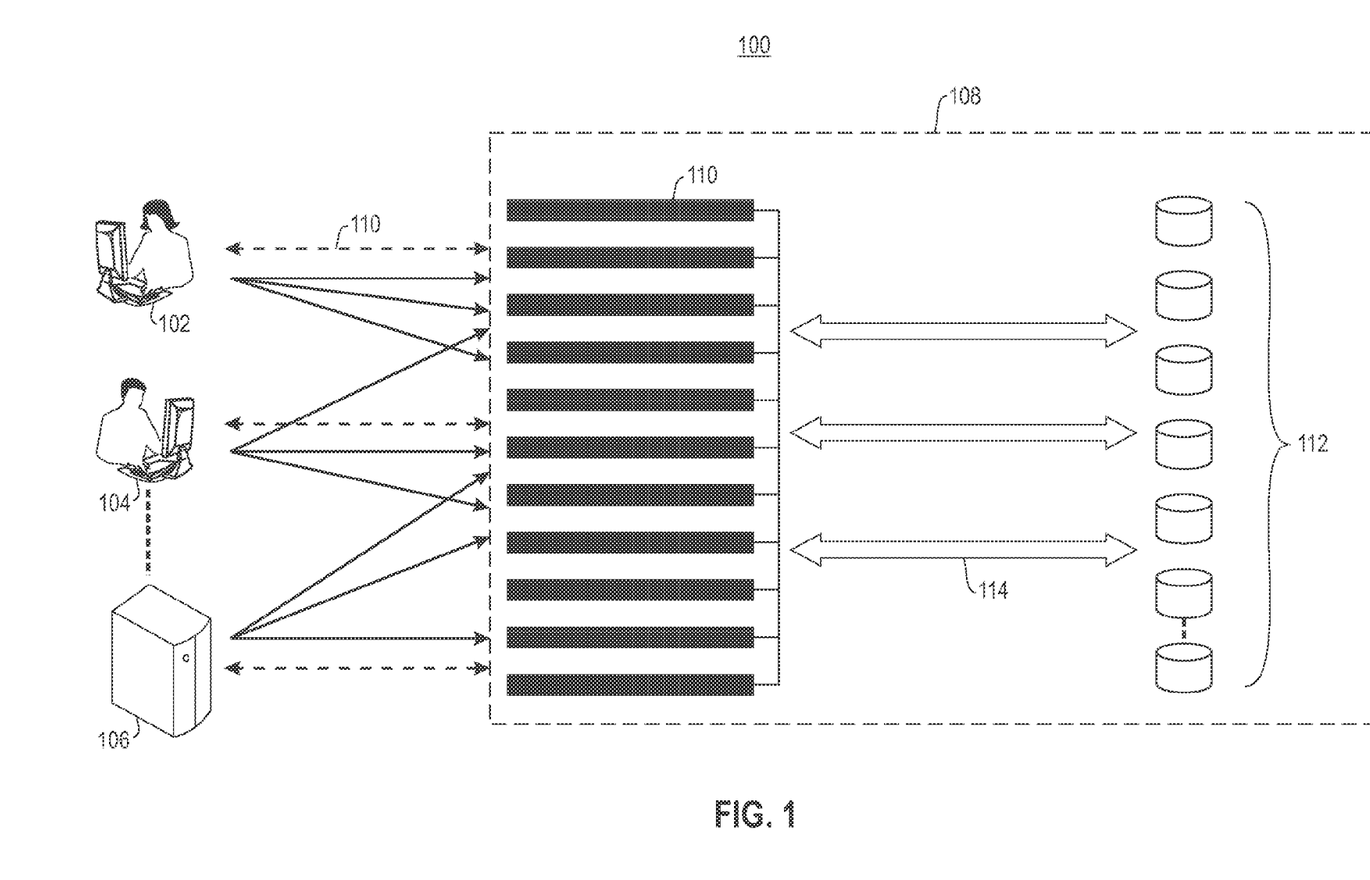
FIG. 1 depicts a diagram illustrating an exemplary file server cluster for running a clustered file system with parallel access to shared storage that implements embodiments of the invention, according to one embodiment.

FIG. 1 depicts a diagram (100) illustrating an exemplary file server cluster (108) (hereinafter "cluster") for running a clustered file system (hereinafter "file system") with parallel access to a shared storage subsystem (112) (hereinafter "storage subsystem") that implements embodiments of the invention, according to one embodiment. The file system supports coordinated access to the file system's storage subsystem using dynamic creation of file access layout for different workloads and access patterns. The diagram includes file based parallel file access protocol clients (e.g., pNFS) (102, 104 . . . 106) that remotely access the file system. For example, the clients may include a parallel file access protocol AIX® client (102), a WINDOWS client (104), and a Linux client (104). The clients send and receive data and metadata to and from the cluster over a network (108).

The cluster includes a plurality of servers (110), including but not limited to state, data, or storage servers (hereinafter "file servers"), working in parallel to serve the file access protocol clients' I/O requests. The "file servers" may include any server (or virtual server) that is part of the storage system and can be used by external applications to access data stored in the storage system. For example, file servers include servers (e.g., IBM System x® servers) configured to support file access protocol client access to a file system's storage. The cluster further includes a storage subsystem (112). In one embodiment, the storage subsystem is scalable (e.g., scale-out storage system). For example, scale-out storage system NAS solutions such as IBM SONAS™, IBM XIV® and IBM Storwize® V7000 disk systems that support over 7,000 disk drives. The file servers are in communication with the storage subsystem over a network (114) (e.g., local area network (LAN) or fiber channel (FC)).

Figure 2:
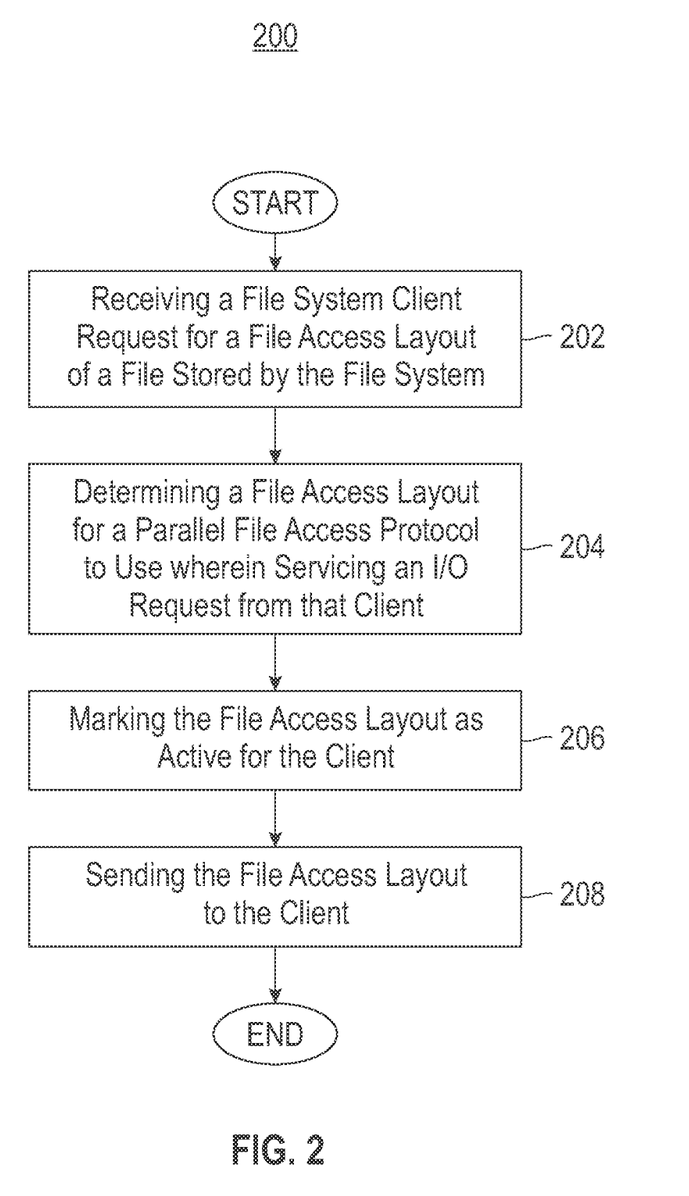
FIG. 2 depicts a flowchart illustrating a process for supporting coordinated access to a clustered file system's shared disk storage subsystem by using dynamic creation of file access layout for different workloads and access patterns, according to one embodiment.

FIG. 2 depicts a flowchart (200) illustrating a process for supporting coordinated access to the file system's storage subsystem by using dynamic creation of file access layout for different workloads and access patterns, according to one embodiment. The file system receives a parallel file access protocol client request for a layout of a file stored by the file system in the storage subsystem (step 202). A particular file server among the plurality of servers in the cluster receives the parallel file access protocol client's file system request.

The particular file server determines a file access layout for a parallel file access protocol to use when servicing the I/O request by that file based parallel file access protocol client (step 204). The determining is based on one or more of: current file system resources; a specific workload type and a specific byte-range of the file included in the client request; and properties of the file. The determining, of the file access layout for a parallel file access protocol to use when servicing an I/O request by the client, is such that the client optimally utilizes available hardware and software resources for the I/O request.

The file access layout includes a set of file servers in a cluster and byte ranges of the file. The byte-range being associated with a particular server among the set of file servers in the cluster. The current file system resources include the following: available file servers; available network bandwidth; available storage bandwidth; open file system connections; processing unit resources; number of file based parallel file access protocol clients currently accessing the file; and number and type of existing active file access layouts for the file. The file system monitors active file systems in the cluster by running an I/O bandwidth optimization algorithm service to determine an aggregate number of file servers and byte ranges for each server to serve requests to the file.

The particular file server then marks the file access layout as active for that file based parallel file access protocol client (step 206) and sends the file access layout to the requesting client (step 208). The client can then use this layout to perform I/O to the file system. The process ends following step 208. In another embodiment, the file system (the particular server) then may receive a returned file access layout from the client after the client is finished performing I/O. In this embodiment, the file system then marks the file access layout as inactive for the client that returned the layout.

Figure 3:
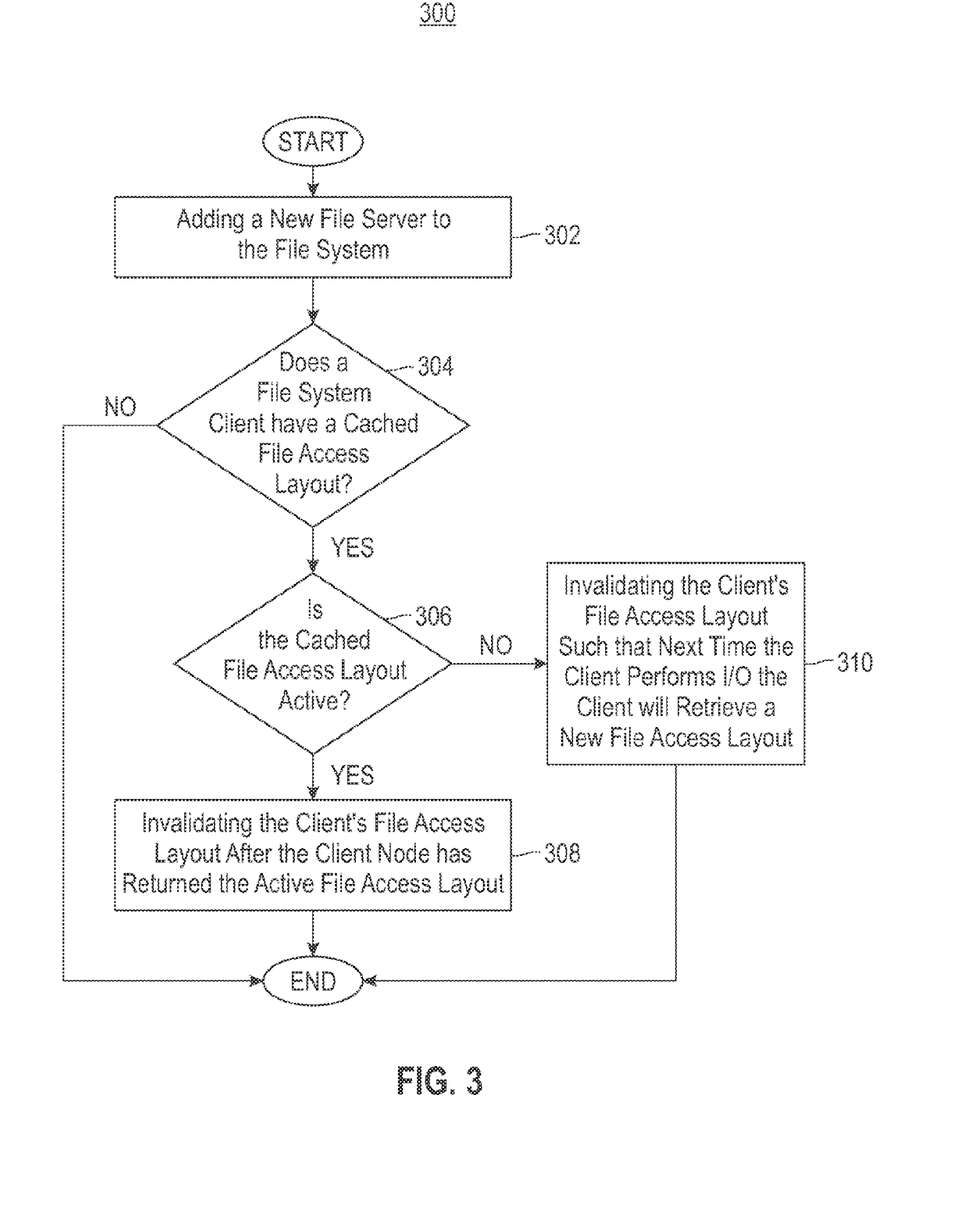
FIG. 3 depicts a flowchart illustrating a process for adding a file server to the clustered file system, according to one embodiment.

FIG. 3 depicts a flowchart illustrating a process (300) for adding a file server to the file system, according to one embodiment. For adding a new file server to the cluster, the file system adds the new file server to the cluster such that a file based parallel file access protocol client's request for a layout includes the added file server in the determined file access layout (step 302).

For the file based parallel file access protocol clients that have mounted the file system, the file system determines whether that client(s) has a cached file access layout (step 304). If that client(s) has a cached file access layout, then the file system determines whether the cached file access layout is active (step 306), and if not then the process ends. The file system then invalidates the client's file access layout after the client has received the active file access layout, if the cached file access layout is active (step 308), and then the process ends. The file system then invalidates the client's file access layout such that next time the client performs I/O to the file system, the client will retrieve a new file access layout, if the cached file access layout is not active (step 310), and then the process ends.

Figure 4:
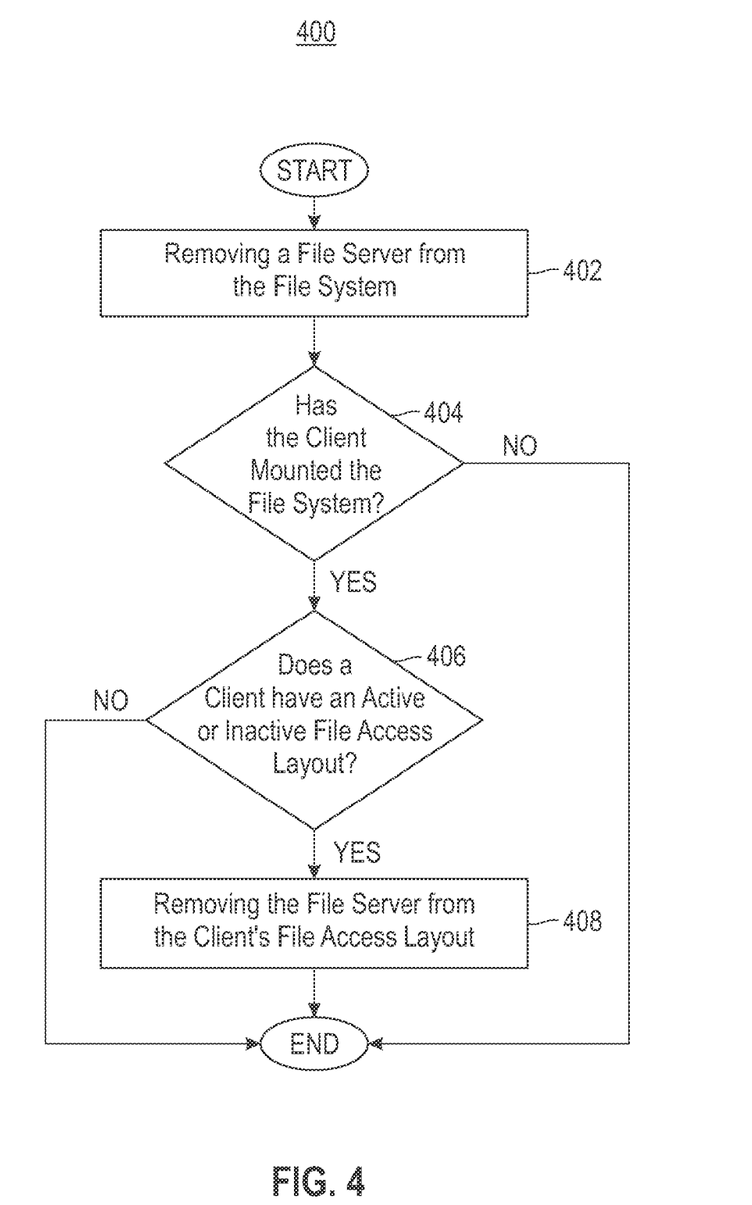
FIG. 4 depicts a flowchart illustrating a process for removing a file server from the clustered file system, according to one embodiment.

FIG. 4 depicts a flowchart illustrating a process (400) for removing a file server from the file system, according to one embodiment. For removing a file server from the cluster, the file system removes a file server from the file system (step 402). The file system then determines whether file based parallel file access protocol clients have mounted the file system (step 404). The process ends if a client has not mounted the file system. For clients that have mounted the file system, the file system then determines whether the mounted clients have an active or inactive file access layout (step 406). The process ends if a client does not have active or inactive layout. The file system then removes the file server from the client's file access layout (step 408). The file server is removed from the clients' file access layout such that the clients' request for a layout does not include the removed file server in the determined file access layout.

In another embodiment, the file system handles file server failures. In one embodiment, upon a file server's failure, the file system has a different file server service a file based parallel file access protocol client's I/O request(s). For clients that have mounted file system and if a client has an active or inactive file access layout, the file system removes the file server from the client's file access layout by determining a new layout for the client that does not include the server that was removed.

Figure 5:
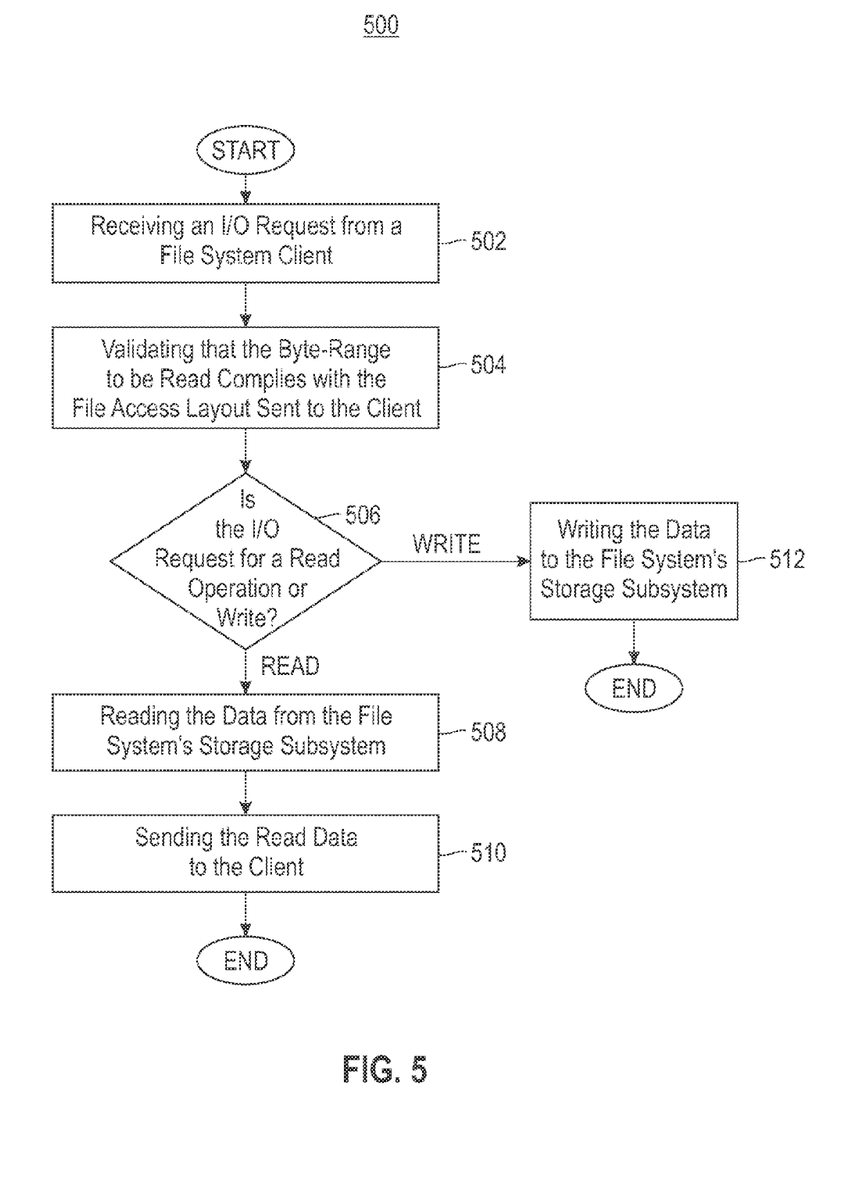
FIG. 5 depicts a flowchart illustrating a process for the clustered file system to serve I/O requests received from a file system client, according to one embodiment.

FIG. 5 depicts a flowchart illustrating a process (500) for the file system to serve I/O requests received from a file based parallel file access protocol client, according to one embodiment. The file system receives an I/O request from a client (step 502). The file system then validates that the byte-ranges (to be accessed) comply with the file access layout sent to that client (step 504). If the request is not validated, the file system must continue to ensure file system data is consistent by returning an error or by coordinating the request as necessary.

The file system then determines whether the I/O request is for a read or write request (step 506). The file system reads the data from the storage subsystem, if the I/O request is a read request (step 508). The file system then sends the read data to that client (step 510), and the process then ends. Following step 506, the file system writes the data to the shared storage if the I/O request is for a write operation (step 512), and then the process ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires; a portable computer diskette; a hard disk; a random access memory (RAM); a read-only memory (ROM); an erasable programmable read-only memory (EPROM or Flash memory); an optical fiber; a portable compact disc read-only memory (CD-ROM); an optical storage device; a magnetic storage device; or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
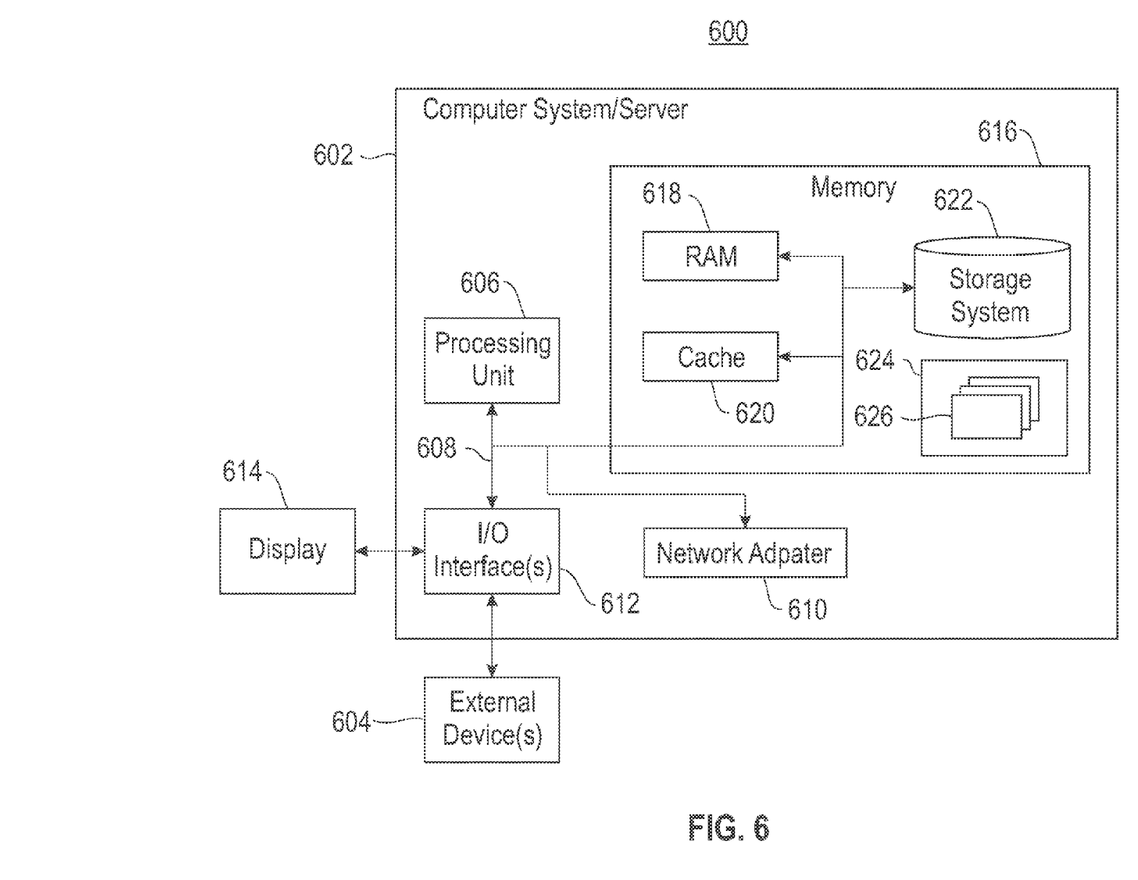
FIG. 6 depicts a block diagram illustrating an exemplary general-purpose computing architecture for implementing embodiments of the present invention.

FIG. 6 depicts a block diagram illustrating an exemplary general-purpose computing architecture (600) for implementing embodiments of the present invention. For example, the computer architecture is suitable as a cloud computing architecture and for implementing and/or performing any of the functionality or embodiments of the invention as described and claimed herein.

The architecture includes a computer system/server (602) (hereinafter "computer"). The components of the computer may include, but are not limited to, one or more processors or processing units (606), a system memory (616), and a bus (608) that couples various system components together, including the system memory to the processing units. The computer can serve as a cloud computing code and is operational with numerous other general purpose or special purpose computing system environments or configurations.

Examples of well-known computing systems, environments, and/or configurations that may be suitable for use with the computer include, but are not limited to: personal computer systems; server computer systems; thin clients; thick clients; hand-held or laptop devices; multiprocessor systems; microprocessor-based systems; set top boxes; programmable consumer electronics; network PCs; minicomputer systems; mainframe computer systems; clustered file systems; server clusters; scalable storage subsystems; and distributed cloud computing environments that include any of the above systems or devices, and the like.

The bus represents one or more of any of several types of bus structures, including a memory bus or memory controller, a peripheral bus, an accelerated graphics port, and a processor or local bus using any of a variety of bus architectures. By way of example, and not limitation, such architectures include: Industry Standard Architecture (ISA) bus; Micro Channel Architecture (MCA) bus; Enhanced ISA (EISA) bus; Video Electronics Standards Association (VESA) local bus; and Peripheral Component Interconnects (PCI) bus. The computer typically includes a variety of computer system readable media. Such media may be any available media that is accessible by the computer, and it includes both volatile and non-volatile media, removable and non-removable media.

The system memory can include computer system readable media in the form of volatile memory, such as random access memory (RAM) (618) and/or cache memory (620). The computer may further include other removable/non-removable, volatile/non-volatile computer system storage media. By way of example only, a storage system or storage subsystem (622) can be provided for reading from and writing to a permanent storage (not shown and typically called a "hard disk drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory may include at least one program product having a set (e.g., at least one) of program modules that are configured to carry out the functions of embodiments of the invention.

The computer may be described in the general context of computer system-executable instructions, such as program modules, being executed by a computer system. Generally, the program modules may include routines, programs, objects, components, logic, data structures, and so on that perform particular tasks or implement particular abstract data types. The computer may be practiced in distributed cloud computing environments where tasks are performed by remote processing devices that are linked through a communications network. In a distributed cloud computing environment, the program modules may be located in both local and remote computer system storage media including memory storage devices.

The program/utility (624), having a set (at least one) of program modules (626), may be stored in the system memory or storage system by way of example, and not limitation, as well as an operating system, one or more application programs, other program modules, and program data. Each of the operating systems, one or more application programs, other program modules, and program data or some combination thereof, may include an implementation of a networking environment. Program modules generally carry out the functions and/or methodologies of embodiments of the invention as described herein.

The computer may also communicate with one or more external devices (604), such as a keyboard, a pointing device, a display (614), etc.; one or more devices that enable a user to interact with the computer; and/or any devices (e.g., network card, modem, etc.) that enable computer to communicate with one or more other computing devices. Such communication can occur via I/O interfaces (612). Still yet, the computer can communicate with one or more networks such as a LAN, a general WAN, and/or a public network (e.g., the Internet) via network adapter (610). As depicted, the network adapter communicates with the other components of the computer via the bus. It should be understood that although not shown, other hardware and/or software components could be used in conjunction with computer. Examples, include, but are not limited to microcode, device drivers, redundant processing units, external disk drive arrays, RAID systems, tape drives, and data archival storage systems, etc.

It is understood in advance that although this Detailed Description includes a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes. By way of example, the cloud computing model may include at least five characteristics, at least three service models, and at least four deployment models.

Characteristics are as follows:

On-demand self service, where a cloud consumer can unilaterally provision computing capabilities, such as server time and network storage, as needed automatically without requiring human interaction with the service's provider.

Broad network access, where capabilities are available over a network and accessed through standard mechanisms that promote use by heterogeneous thin or thick client platforms (e.g., mobile phones, laptops, and PDAs).

Resource pooling, where the provider's computing resources are pooled to serve multiple consumers using a multi-tenant model, with different physical and virtual resources dynamically assigned and reassigned according to demand. For example, there is a sense of location independence in that the consumer generally has no control or knowledge over the exact location of the provided resources but may be able to specify location at a higher level of abstraction (e.g., country, state, or datacenter).

Rapid elasticity, where capabilities can be rapidly and elastically provisioned, in some cases automatically, to quickly scale out and rapidly released to quickly scale in. For example, to the consumer, the capabilities available for provisioning often appear to be unlimited and can be purchased in any quantity at any time.

Measured service, where cloud systems automatically control and optimize resource use by leveraging a metering capability at some level of abstraction appropriate to the type of service (e.g., storage, processing, bandwidth, and active user accounts). For example, resource usage can be monitored, controlled, and reported providing transparency for both the provider and consumer of the utilized service.

Service Models are as follows:

Software as a Service (SaaS), the capability provided to the consumer is to use the provider's applications running on a cloud infrastructure. The applications are accessible from various client devices through a thin client interface such as a web browser (e.g., web-based e-mail). For example, the consumer does not manage or control the underlying cloud infrastructure including network, servers, operating systems, storage, or even individual application capabilities, with the possible exception of limited user-specific application configuration settings.

Platform as a Service (PaaS), the capability provided to the consumer is to deploy onto the cloud infrastructure consumer-created or acquired applications created using programming languages and tools supported by the provider. For example, the consumer does not manage or control the underlying cloud infrastructure including networks, servers, operating systems, or storage, but has control over the deployed applications and possibly application hosting environment configurations.

Infrastructure as a Service (IaaS), the capability provided to the consumer is to provision processing, storage, networks, and other fundamental computing resources where the consumer is able to deploy and run arbitrary software, which can include operating systems and applications. For example, the consumer does not manage or control the underlying cloud infrastructure but has control over operating systems, storage, deployed applications, and possibly limited control of select networking components (e.g., host firewalls).

Deployment Models are as follows:

Private cloud, the cloud infrastructure is operated solely for an organization. For example, the private cloud may be managed by the organization or a third party and may exist on-premises or off-premises.

Community cloud, the cloud infrastructure is shared by several organizations and supports a specific community that has shared concerns (e.g., mission, security requirements, policy, and compliance considerations). For example, a community cloud may be managed by the organizations or a third party and may exist on-premises or off-premises.

Public cloud, the cloud infrastructure is made available to the general public to a large industry group and is owned by an organization selling cloud services.

Hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

Figure 7:
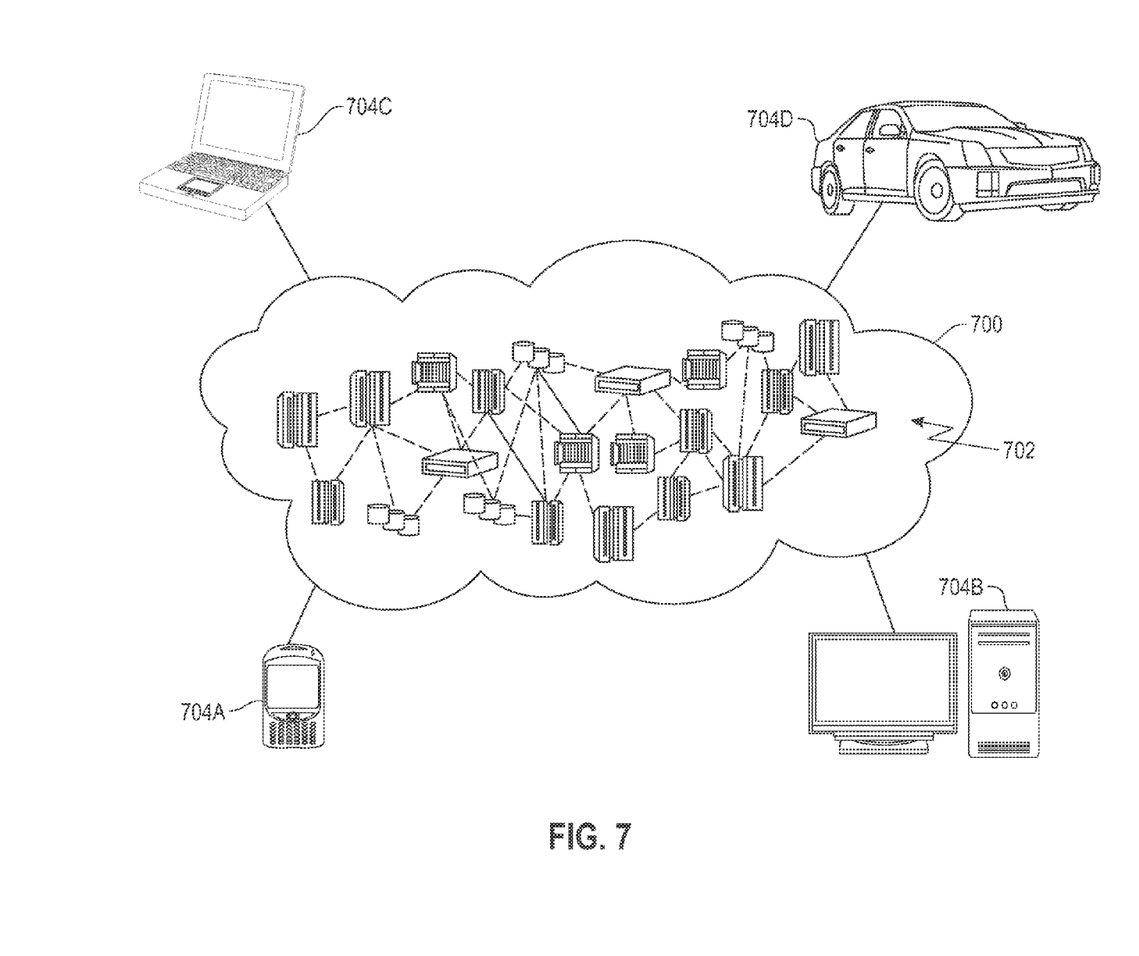
FIG. 7 depicts a block diagram illustrating an exemplary cloud computing environment, according to one embodiment.

FIG. 7 depicts a block diagram illustrating an exemplary cloud computing environment, according to one embodiment. As shown, cloud computing environment 700 comprises one or more cloud computing nodes 702 with which local computing devices used by cloud consumers, such as, for example, personal digital assistant (PDA) or cellular telephone 704a, desktop computer 704b, laptop computer 704c, and/or automobile computer system 704d may communicate. The nodes may communicate with one another. They may be grouped (not shown) physically or virtually, in one or more networks, such as private, community, public, or hybrid clouds as described hereinabove, or a combination thereof. This allows the cloud computing environment to offer infrastructure, platforms and/or software as services for which a cloud consumer does not need to maintain resources on a local computing device. It is understood that the types of computing devices shown in are intended to be illustrative only and that computing nodes and cloud computing environment can communicate with any type of computerized device over any type of network and/or network addressable connection (e.g., using a web browser).

Figure 8:
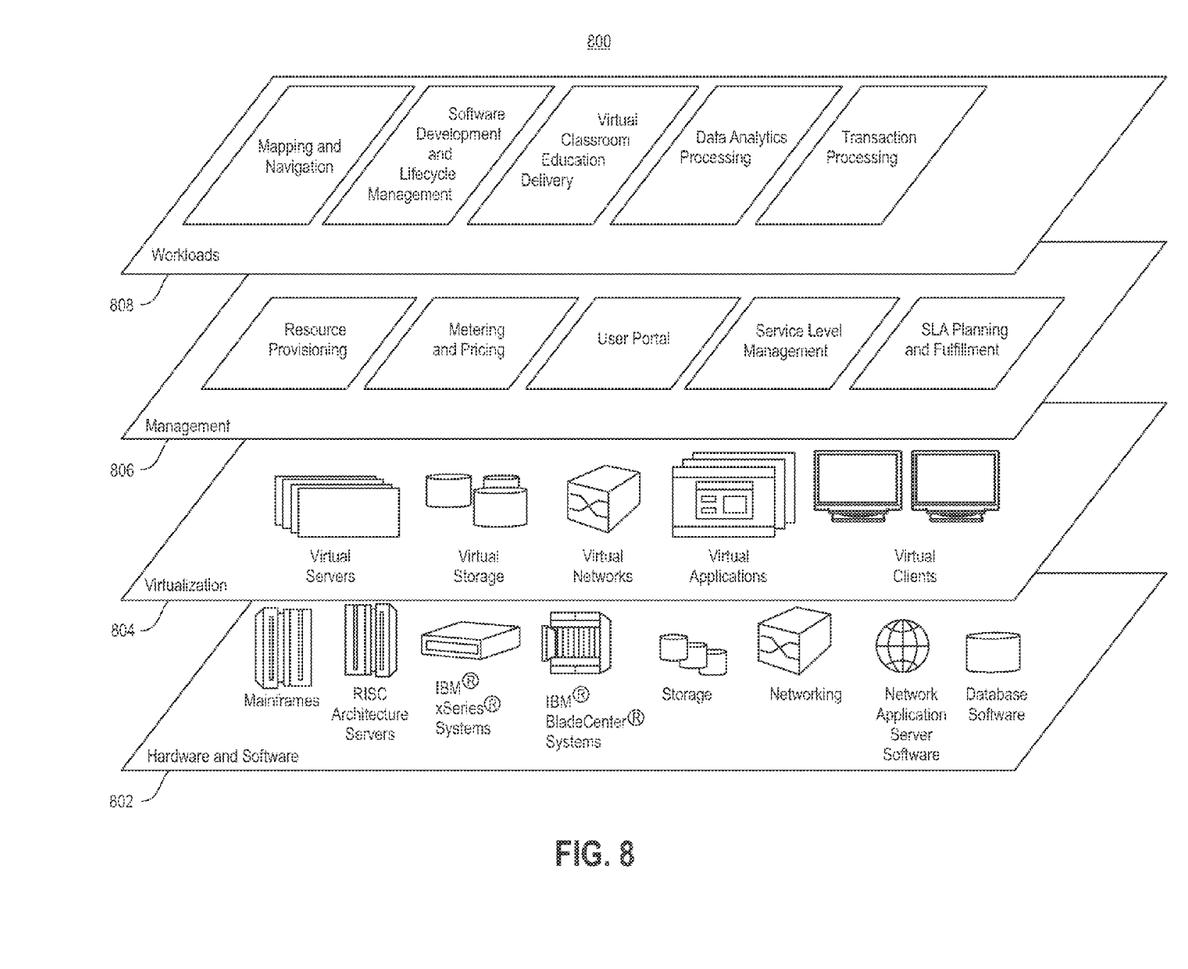
FIG. 8 depicts a block diagram illustrating exemplary abstraction model layers, according to one embodiment.

FIG. 8 depicts a block diagram illustrating exemplary abstraction model layers, according to one embodiment. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include: network application server software; in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 804 provides an abstraction layer from which the following examples of virtual entities may be provided: virtual servers; virtual storage; virtual networks, including virtual private networks; virtual applications and operating systems; and virtual clients.

In one example, management layer 806 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 808 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to data item identification, including, but not limited to, supporting coordinated access to a clustered file system's shared disk storage subsystem by using dynamic creation of file access layout for different workloads and access patterns.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A method of supporting coordinated file access using NFS (Network File System) protocol for metadata and I/O to a clustered file system's shared disk storage subsystem dynamic creation of file access layout for different workloads and access patterns, wherein running file servers in the clustered file system have equivalent access to shared data of the clustered file system, comprising:

in response to a NAS (Network-Attached Storage) protocol client's request for a file access layout of a file stored by the clustered file system in the clustered file system's shared disk storage subsystem, determining a file access layout identifying hostnames or IP addresses for a parallel file access protocol to use when servicing an I/O request by a client of the clustered file system associated with the request;

wherein, any file server in the clustered file system may receive the client's request and the determining is based on a specific workload type and a specific byte-range of the file included in the client request, and the file access layout includes a set of hostnames or IP addresses of file servers in the clustered file system and byte ranges of the file, and the byte-range being associated with a particular server among the set;

marking the file access layout as active for the client;

adding the client to a list indicating what particular clients of the clustered file system are using the file access layout, wherein any client of the clustered file system can share a same file access layout and modify ranges of a file simultaneously; and sending the file access layout to the client.

2. The method of claim 1, further comprising:
receiving a returned file access layout from the client;
marking the returned file access layout as inactive for the client; and
removing the client from the list of clients that are using the returned file access layout thereby revoking the client's access.

3. The method of claim 1, further comprising:
adding a new file server to the clustered file system such that a client's request for a file access layout may include the added file server in the determined file access layout; and
wherein, for clients that have mounted the clustered file system, if: (i) a client has an active file access layout, and (ii) the cached file access layout is not active, invalidating the client's file access layout and removing the client from the list of clients using the file access layout such that the next time the client performs I/O the client will retrieve a new file access layout from the clustered file system.

4. The method of claim 1, further comprising:
adding a new file server to the clustered file system such that a client's request for a file access layout may include the added file server in the determined file access layout; and
wherein, for clients that have mounted the clustered file system, if a client has an active file access layout and the file access layout is currently being used to perform I/O to the clustered file system, invalidating the client's file access layout after the client node has completed the I/O and returned the active file access layout to the clustered file system.

5. The method of claim 4, wherein the new server can include any layout for any file of any number of file access clients without any additional synchronization.

6. The method of claim 1, further comprising:
removing a file server from the clustered file system such that a client's request for a file access layout that will no longer include the removed file server in the determined file access layout;
wherein, for clients that have mounted the clustered file system and have an inactive file access layout, invalidating the file access layout on the client such that the client must request a new file access layout that does not include the server that was removed or determining a new file access layout for the client that does not include the server that was removed; and
replacing the file access layout on the client; and updating the list of clients that are using the new file access layout.

7. The method of claim 1, further comprising:
in response to a file server's failure, choosing one of the remaining active file servers and having it service a client's I/O request(s);
in response to the clustered file system detecting the file server's failure, the clustered file system determines which clients have mounted the clustered file system and have an active file access layout; and
if the file access layout is active, the clustered file system either: i) invalidating the client's file access layout after the client node has completed the I/O such that the client must then request a new file access layout, ii) removing the file server from the client's file access layout; or iii) calculating a new file access layout and substituting it for the existing one and recording that the client is using the new layout; or
if the file access layout is not active, the clustered file system either: i) invalidating the client's file access layout such that the client must then request a new file access layout; ii) removing the file server from the client's file access layout; or iii) calculating a new file access layout and substituting it for the existing one and recording that the client is using the new layout.

8. The method of claim 1, wherein the determination of the makeup of the file access layout and if a file access layout should even be granted to a client are dependent upon the resources, wherein the resources are selected from the group consisting of: (i) available file servers, (ii) available network bandwidth, (iii) available storage bandwidth, (iv) open file system connections, (v) processing unit resources, (vi) number of clients currently accessing the file, and (vii) number and type of existing active file access layouts for the file; and wherein the client's workload comprises its pattern of issuing NFS protocol requests.

9. The method of claim 8, further comprising:
revoking and/or updating client file access layouts in response to one or more of a change in the resources.

10. The method of claim 1, wherein the resources are determined by monitoring running file servers of the clustered file system and tracking each client's workload across the clustered file system over time.

11. The method of claim 10, wherein the clustered file system, to perform the monitoring, runs an I/O performance optimization algorithm service to determine an aggregate number of file servers and byte ranges for each server to serve requests to the file based upon the client's workload over time.

12. The method of claim 1, further comprising:
upon receiving a write request from a client, validating that byte-range to be written complies with the file access layout that was sent to the client; and
writing the data to the clustered file system's shared disk storage subsystem and coordinating with other file system requests using a distributed lock protocol.

13. The method of claim 1, further comprising:
upon receiving a read request from a client of the clustered file system, validating that byte-range to be read complies with the file access layout that was sent the client; and
reading the data from the clustered file system's shared disk storage subsystem, coordinating with other file system requests using a distributed lock protocol, and sending that data to the client.

14. The method of claim 1, wherein each file server in the clustered file system shares a common pool of available storage capacity such that the determining is based upon the common pool of available storage capacity.

15. The method of claim 1, wherein the file access layout may be the same for other clients of the clustered file system or comprise a different set of IP addresses and associated byte-ranges.

16. The method of claim 1, wherein the NFS protocol is pNFS (Parallel NFS).

17. The method of claim 1, further comprising:
upon receiving a write request from a client, if the byte-ranges to be written do not comply with the file access layout that was sent to the client;
then returning an error to the client, or revoking the file access layout on the client and force the client to request a new layout.

18. A system of supporting coordinated file access using NFS (Network File System) protocol for metadata and I/O to a clustered file system's shared disk storage subsystem using dynamic creation of file access layout for different workloads and access patterns, comprising:
a shared disk storage subsystem that stores the clustered file system's shared data;
a plurality of file servers in a cluster, each of the file servers that are running having equivalent access to the shared data of the clustered file system, wherein the system, in response to a NAS (Network-Attached Storage) protocol client's request for a file access layout of a file stored by clustered file system in the clustered file system's shared disk storage subsystem, determines a file access layout identifying hostnames or IP addresses for a parallel file access protocol to use when servicing an I/O request by a client of the clustered file system that made the client's request;
wherein, any file server in the clustered file system may receive the client's request and the determine is based on a specific workload type and a specific byte-range of the file included in the client request, and the file access layout includes a set of hostnames or IP addresses of the file servers and byte ranges of the file, and the byte-range being associated with a particular server among the set; and
wherein the system, marks the file access layout as active for the client, adds the client to a list indicating what particular clients of the clustered file system are using the file access layout, wherein any client of the clustered file system can share a same file access layout and modify ranges of a file simultaneously, and sends the file access layout to the client.

19. A computer program product of supporting file access using NFS (Network File System) protocol for metadata and I/O to a clustered file system's shared disk storage subsystem dynamic creation of file access layout for different workloads and access patterns, wherein running file servers in the clustered file system have equivalent access to shared data of the clustered file system, the computer program product comprising a computer readable storage medium having computer usable program code embodied therewith, the computer usable program code being executable to:
in response to a NAS (Network-Attached Storage) protocol client's request for a file access layout of a file stored by the clustered file system in the clustered file system's shared disk storage subsystem, determine a file access layout identifying hostnames or IP addresses for a parallel file access protocol to use when servicing an I/O request by a client of the clustered file system that made the client's request;
wherein, any file server in the clustered file system may receive the client's request and the determine is based on a specific workload type and a specific byte-range of the file included in the client request, and the file access layout includes a set of hostnames IP addresses file servers in the clustered file system and byte ranges of the file, and the byte-range being associated with a particular server among the set;
mark the file access layout as active for the client;
adds the client to a list indicating what particular clients of the clustered file system are using the file access layout, wherein any client of the clustered file system can share a same file access layout and modify ranges of a file simultaneously; and
send the file access layout to the client.

20. The computer program product of claim 19, the computer usable program code being further executable to:
receive a returned file access layout from the client;
mark the returned file access layout as inactive for the client; and
remove the client from the list of clients that are using the returned file access layout thereby revoking the client's access.

21. The computer program product of claim 19 the computer usable program code being further executable to:
add a new file server to the clustered file system such that a client's request for a file access layout may include the added file server in the determined file access layout; and
wherein, for clients that have mounted the clustered file system, if: (i) a client has a cached file access layout, and (ii) the cached file access layout is not active, invalidate the client's file access layout and remove the client from the list of clients using the file access layout such that the next time the client performs I/O the client will retrieve a new file access layout from the clustered file system.

22. The computer program product of claim 19, the computer usable program code being further executable to:
add a new file server to the clustered file system such that a client's request for a file access layout may include the added file server in the determined file access layout; and wherein, for clients that have mounted the clustered file system, if a client has an active file access layout and the file access layout is currently being used to perform I/O to the clustered file system invalidate the client's file access layout after the client node has completed the I/O and returned the active file access layout to the clustered file system.

23. The computer program product of claim 19, the computer usable program code being further executable to:
remove a file server from the clustered file system such that a client's request for a file access layout that will no longer include the removed file server in the determined file access layout;
wherein, for clients that have mounted the clustered file system and have an inactive file access layout, invalidate the file access layout on the client such that the client must request a new file access layout that does not include the server that was removed or determine a new file access layout for the client that does not include the server that was removed; and
replace the file access layout on the client; and
update the list of clients that are using the new file access layout.

24. The computer program product of claim 19, the computer usable program code being further executable to:

in response to a file server's failure, choosing one of the remaining active file servers and having it service a client's I/O request(s);

in response to the clustered file system detecting the file server's failure, the clustered file system determines which clients have mounted the clustered file system and have an active file access layout; and if the file access layout is being used to perform I/O to the clustered file system, the clustered file system: i) invalidate the client's file access layout after the client node has completed the I/O such that the client must then request a new file access layout, ii) remove the file server from the client's file access layout; or iii) calculate a new file access layout and substituting it for the existing one and recording that the client is using the new layout; or if the file access layout is not being used to perform I/O to the clustered file system, the clustered file system either: i) invalidate the client's file access layout such that the client must then request a new file access layout; ii) remove the file server from the client's file access layout; or iii) calculate a new file access layout and substituting it for the existing one and recording that the client is using the new layout.

25. The computer program product of claim 19, the computer usable program code being further executable to:

upon receiving a write request from a client, validate that the byte-range to be written complies with the file access layout that was sent to the client; and write the data to the clustered file system's shared disk storage subsystem and coordinating with other file system requests using a distributed lock protocol.

26. The computer program product of claim 19, the computer usable program code being further executable to:

upon receiving a read request from a client of the clustered file system, validating that the byte-range to be read complies with the file access layout that was sent the client; and read the data from the clustered file system's shared disk storage subsystem, coordinate with other file system requests using a distributed lock protocol and send that data to the client.

* * * * *